(No Model.)

D. W. THOMPSON.
COMBINED BUTTON LAP AND STAY PIECE FOR GARMENT SLITS.

No. 289,469. Patented Dec. 4, 1883.

Witnesses
Charles S. Brintnall
J. B. Wilkinson Jr.

Inventor
David W. Thompson
by William E. Hagan
his Attorney (No Model.)
2 Sheets—Sheet 2.

D. W. THOMPSON.
COMBINED BUTTON LAP AND STAY PIECE FOR GARMENT SLITS.

No. 289,469.
Patented Dec. 4, 1883.

Witnesses
Charles S. Brintnall
J. B. Wilkinson Jr.

Inventor
David W. Thompson
by William E. Hagan
his Attorney

UNITED STATES PATENT OFFICE.

DAVID W. THOMPSON, OF ENGLEWOOD, ILLINOIS, ASSIGNOR OF ONE-THIRD TO JUSTUS MILLER, OF TROY, NEW YORK.

COMBINED BUTTON-LAP AND STAY-PIECE FOR GARMENT-SLITS.

SPECIFICATION forming part of Letters Patent No. 289,469, dated December 4, 1883.

Application filed September 1, 1882. (No model.)

*To all whom it may concern:*

Be it known that I, DAVID W. THOMPSON, of Englewood, county of Cook, and State of Illinois, have invented a new and useful Improvement in Combined Button-Lap and Staying-Piece for Garment-Slits, of which the following is a specification.

My invention relates to the form and application of the pieces of fabric material used to produce a combined button-lap and staying-piece for the slit-openings formed in garments; and the object of my invention is to simplify the attachment and the form of the pieces thus used, so that skilled labor will not be required to cut or to attach them, and also to avoid waste of material in their production.

As heretofore produced and applied the blank forms cut to make combined button-laps and staying-pieces were each shaped so as to have two widths and a longitudinal-fold line, or they were cut of an irregular lozenge-form that required care and skilled labor to cut, fold, and attach them.

To obviate these difficulties, and to simplify the work to be done in shaping and attaching these pieces, I cut the fabric or material from which they are to be made of one uniform width in continuity and hem-fold the edges of the piece, in a manner hereinafter to be described, for attachment, and from the piece so cut and folded I cut suitable lengths, which, when attached, are adapted to produce a button-lap or staying-piece.

Attached hereto and forming a part of this specification are two plates of drawings, containing six figures, and in all of which the same designation of parts by letter-reference is used.

Figure 1:
Figure 2:
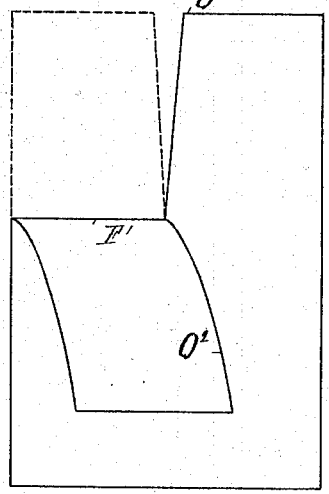
Figure 3:
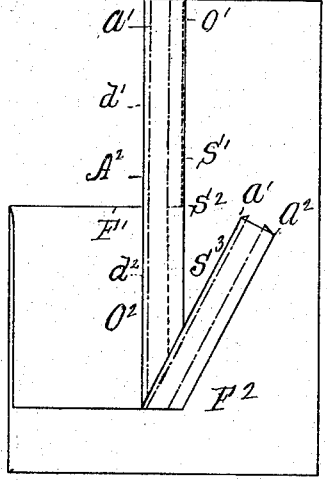
Figure 4:
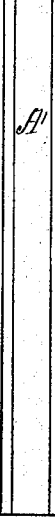
Figure 4:
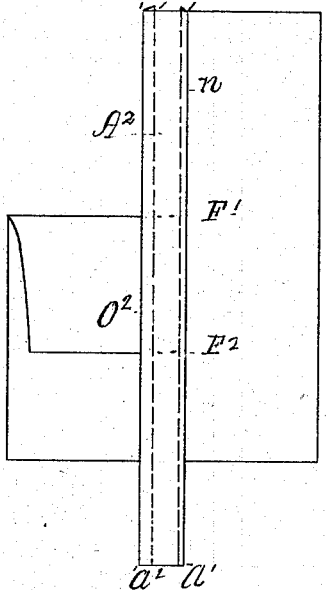
Figure 5:
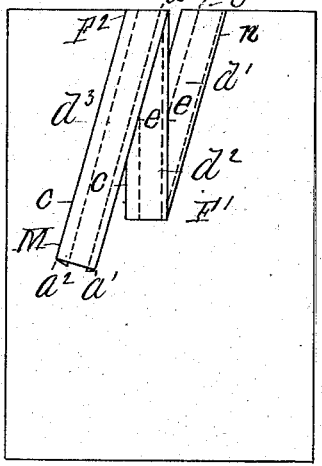
Figure 6:
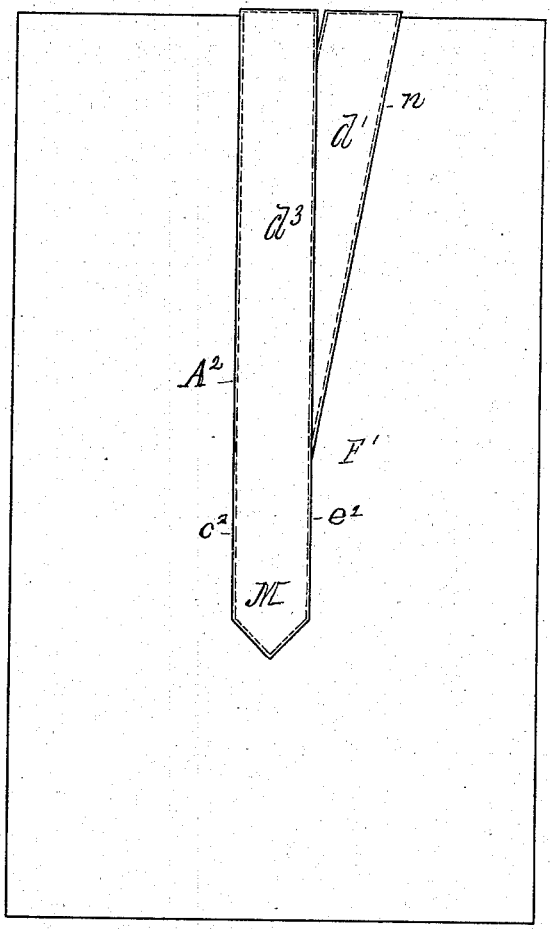

Figure 1 shows a strip of fabric material which may be prolonged to any desirable length, it having produced upon one of its edges a turned-down and creased narrow hem-fold, and upon its other edge a wider hem-fold, and adapted to be cut off into lengths, as indicated by a dotted line. Fig. 2 illustrates a portion of a garment containing a slit-opening with that part of the garment upon one side of the slit folded over and down. Its position before being folded down is indicated by dotted lines. Fig. 3 shows the same parts of a garment, and in the same position as shown in Fig. 2, with a length cut from the strip (shown at Fig. 1) attached to the edge of the slit at one side of the latter from top to bottom by means of a row of stitching, uniting this edge of the slit to that edge of the strip on the side of the latter having the wider hem-fold, and a continuation of the strip therefrom sewed to the other side of the garment-slit on the line of the wider hem-fold, the two vertical seams thus uniting the strip in continuity to the opposite sides of the slit, being connected at the bottom of the latter by a transverse seam uniting the strip and garment at that point. Thus the strip is shown as attached at its edge to one side of the slit, and in continuity to the other side of the slit on the line of its wider hem-fold away from the edge of the strip. Fig. 4 illustrates another step in the process with all the parts in position, as shown in Fig. 3, with the exception that the strip has been turned over and down on the fold-line of its wider hem-fold. Fig. 5 illustrates another step in the process and the position of the parts after the staying-piece has been joined to the two sides of the slit, as shown at Fig. 3, and the strip folded over and down longitudinally, as shown at Fig. 4, with the there-shown turned-down side of the garment-slit turned back to position. Fig. 6 illustrates the position of the parts after the completion of the several steps by which the strip is attached.

As illustrated, it will be seen that the staying-piece and button-lap consists of a strip transversely cut from the piece A', and transversely folded at F' and F² to produce the folds or parts $d'$, $d^2$, and $d^3$, and that the strip A' is of uniform width, upon one edge of which has been creased the narrow hem-fold $a'$, and upon the other edge another longitudinal wider hem-fold, $a^2$, and that this strip is attached to the garment-slit in the following manner: Upon the outer fabric edge of the hem-fold $a^2$ the part or fold $d'$ is united to the edge of the garment-slit O' by means of the seam S', and the fold or part $d^2$ on the line of its wider hem-fold $a^2$, as indicated at S³, is sewed to the other side of the garment-slit, away from the edge of the latter and the edge of the strip. At S² a transverse seam is run laterally to unite the garment and strip between where the vertical seams S' and S³ terminate at the bottom of the slit, so that the strip cut from the piece A' and designated at A², is attached in continuity to the two opposite sides of the garment-slit by the two vertical seams S' S³, and the strip to the garment at the bottom of the slit by the transverse seam S², as shown in Fig. 3. When this has been so done, the strip in continuity is folded longitudinally over and down on the hem-fold line $a^2$, as shown in Fig. 4, and the fold $d'$ on the line of its narrow hem-fold is united to the garment, as indicated at N. When this has been accomplished, the turned-down side of garment-slit is turned up, and with it the attached strip on the transverse fold-line F'. The upwardly-projected end of the strip is then turned over and down outwardly on the transverse fold-line F², as appearing at Fig. 5, preparatory to closing and uniting the coincident edges of the strip. By means of the two transverse fold-lines made in the strip, and indicated at F' and F², the strip, although in continuity, is folded into three parts, indicated at $d'$, $d^2$, and $d^3$. The folded portion designated at $d'$ forms an overlapping binding-piece for one edge of the garment-slit; the intermediately-folded portion $d^2$ an interior facing to the fly, and the exteriorly-folded part $d^3$ the outer facing for the fly, and where projected downwardly below the slit and attached to the garment, an additional staying-piece. The outer edges of the two folds, producing the fly on their outer edges at $e$, are sewed together, and their inner edges at $c$ are also sewed, so as to include intermediately and overlap the seam uniting one edge of the slit with the wider hem-fold line of strip. Below the slit the fold $d^3$ of the strip A² is united to the garment by the downward continuation of the seams $e^2$ and $c^2$, as indicated at M.

As the folded parts $d'$ and $d^2$ of the strip A² in continuity would perform the same function, if attached as shown, whether the part $d^3$ was in continuity a part of the same piece or cut from a like piece, I do not limit my invention to the use of a single strip shaped and folded, as shown at A², to produce, by transversely folding the same, the three folded parts $d'$ $d^2$ $d^3$; but I do limit my invention to the use of a single piece transversely folded, that will produce, as shown, the folds $d'$ and $d^2$, and in connection therewith either a continuity of the same piece or a piece transversly cut from such a piece to produce the part $d^3$.

I am well aware that the transverse seam S², herein shown, is illustrated and described in another application for a patent upon an improved button-lap and staying-piece made by me and filed in the Patent Office on the 24th day of February, 1882, and which is now pending; and I am also aware that in said application said transverse seam was combined with a vertical seam which united the staying-piece and garment-slit away from the edge of the latter, and that in consequence thereof my invention herein is limited to the improvement made in combining with such a means of attachment as is described in said application a new form and method of attaching the strip.

The material from which lengths are taken to produce the button-laps and staying-pieces is cut off a proper width and any desirable length, and then, in the piece, run through a hem-folding device, which turns down and creases longitudinally both edges of the strip with a narrow fold of about one-eighth the width of the strip upon one edge, and a fold about one-third the width of the strip upon the other edge, and in which condition it may be ribbon-rolled or packaged in any suitable form, for sale as an article manufactured and shaped for a specific purpose.

I am well aware that a strip having turned down and hemmed edges has been employed for a like purpose; but as a strip having an equal width of hem-fold that was hemmed and secured could not be employed in the manner herein described, and the fact that both the folded edges of my strip must be free for attachment and folded to have the differing widths of fold herein shown and described, I disclaim the use of strip so made with an equal fold and secured by being hemmed, and which has been patented.

Having thus described my invention, what I claim, and desire to secure by Letters Patent, is—

A combined button-lap and staying-piece for garment-slits, in combination, consisting of a strip of material having uniform width and made with the hem-fold edges $a'$ and $a^2$ of differing width, which strip is cut or folded transversely to produce the facings or folds $d'$ and $d^2$ in one piece and the facing or fold $d^3$ from a separate piece, or folded transversely at F' and F² to produce the three facings or folds $d'$, $d^2$, and $d^3$ from one piece, with the facing or fold $d'$ on its fabric edge at S' sewed to one side of the garment-slit, and the facing or fold $d^2$ on the fold-line of the wider hem-fold sewed to the opposite side of the garment-slit, away from the edge of the latter, with the transverse seam S² uniting the strip to the garment-slit at the bottom of the latter, between the lower ends of the vertical seams S' and S³, and the strip folded over and down on the fold-line of the wider hem-fold $a^2$, the facing-fold $d'$ sewed to the garment on the line of its narrow hem-fold $a'$, the coincident edges of the facing-folds $d^2$ and $d^3$ sewed together, and the fold-facing $d^3$ sewed to the garment, below the slit, as shown and described.

Signed in the city of New York, this 21st day of August, A. D. 1882.

DAVID W. THOMPSON.

Witnesses:
W. H. PATTEN,
EDWARD DONAHOE.